Nov. 3, 1936.    J. L. ADAMS, JR    2,059,300
APPARATUS FOR THE FORMATION OF ARTICLES BY WELDING
Filed Sept. 9, 1932    7 Sheets-Sheet 2

INVENTOR

Nov. 3, 1936.  J. L. ADAMS, JR  2,059,300
APPARATUS FOR THE FORMATION OF ARTICLES BY WELDING
Filed Sept. 9, 1932  7 Sheets-Sheet 7
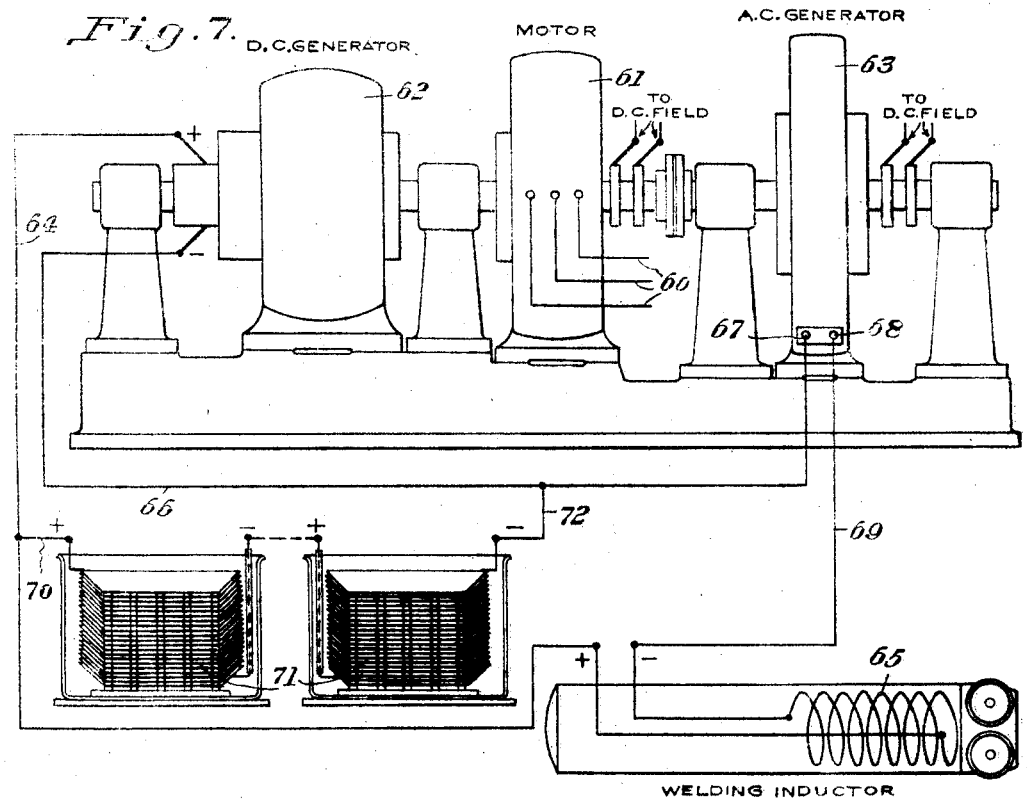
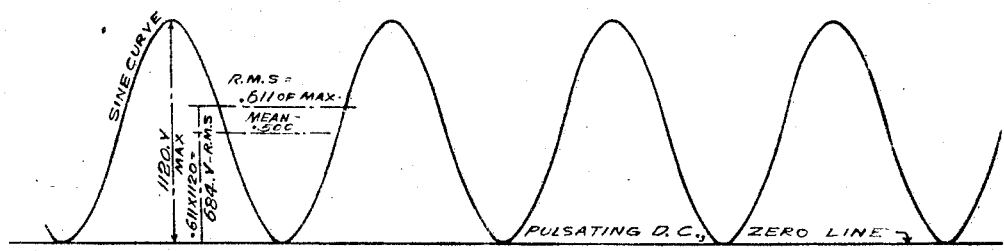

Patented Nov. 3, 1936

2,059,300

UNITED STATES PATENT OFFICE 2,059,300

APPARATUS FOR THE FORMATION OF ARTICLES BY WELDING

James L. Adams, Jr., Youngstown, Ohio, assignor to The Youngstown Sheet and Tube Company, Youngstown, Ohio, a corporation of Ohio Application September 9, 1932, Serial No. 632,381

12 Claims. (Cl. 219—6)

The present invention relates broadly to the art of welding, and more particularly to the art of so-called induction welding wherein the current for welding purposes is caused to flow in the article to be welded without the use of actual contacts in engagement with the article.

The present invention has for certain of its objects improvements in the efficiency of welding apparatus, and more particularly from the standpoint of the amount of heating obtained for the current utilized. Another of the objects is to obtain the desired welding operation within a comparatively short space, permitting the use of a welder of smaller over-all dimensions for a given sized article than has heretofore been considered feasible.

It is well known to those skilled in the art that the production of tubes for example by a continuous process of electric seam welding is entirely practicable by the use either of the steady direct current, or by the use of an alternating current. In many cases reference has been made to the possibility of utilizing a pulsating direct current for this purpose, but up to the present time applicant is not aware of any actual structure which has been provided for the purpose of enabling such a pulsating direct current to be utilized.

Another of the objects of the present invention is to provide a welder which may be operated by the use of such a pulsating direct current, as well as to indicate mechanism by means of which such a current can be commercially produced without undue supplementary complications.

From the standpoint of compactness, which has been before referred to, and particularly as applied to tube welding apparatus, it must be borne in mind that at least to a considerable extent the efficiency of the weld is dependent upon the accuracy with which the edges to be welded are maintained in some predetermined relative position throughout both the heating and welding operation. If the heating zone is unduly increased in length, difficulties are encountered with respect to maintaining the desired edge relationship, and particularly of the extreme end portions of the tubing which obviously, during both the heating and welding thereof, cannot project entirely through the apparatus, or so as to be supported by both the two main roll passes. If the structure of the welder is such that the necessary heating current can be put into the tube within a comparatively short axial distance, greater accuracy and greater uniformity of welding are made possible, particularly at the two end portions of the tube, since the roll passes can then be mounted closer together than before.

It is also characteristic of the present day induction welders that their efficient operation is dependent upon a certain constant length of tubing being within the heating zone at any given time. Since such a requirement exists, it is frequently difficult to attain the necessary welding temperature conditions in the edge portions of the leading and trailing ends of the tubes, and particularly the latter end. This is because the ends present a constantly varying amount of tube to the influence of the heating zone. This has resulted in high end-scrap losses. Further, if the heating is done too far away from the final zone of welding pressure, the edge temperature may fall below that required for welding, before the welding pressure zone is reached. By the present invention, the greater compactness is of itself sufficient to insure a more closely adjacent relationship between the welding zones and heating zones so that edge portions at a proper welding temperature may be insured. Coupled with this compactness are structural features which enable much of the heating to be accomplished very close to the final welding position, thereby causing more effective and constant heating along the entire tube length, and particularly of the end portions, with consequent better welding thereof, and with less chance of too great a fall of temperature occurring between the final heating and the pressure welding zone.

Many welders, regardless of their specific structural characteristics, and particularly induction welders, are characterized by inherent difficulties due to strong magnetic fields which are not properly shielded, controlled or confined, causing stray eddy currents, or sneak currents, in various parts either of the apparatus or of the articles, wherein such induced loss currents are not desirable, since they lead to irregular variations in the edge heating. In accordance with the present invention, the electrical and magnetic working parts of a welding apparatus are substantially surrounded or enclosed by heavy or massive short-circuited shields of suitable highly conducting material, such for example as copper, whereby to effectually and inductively deflect the working fluxes out of and away from working parts such as rolls, guides and the like, and thus prevent the possibility of even slight heating of such parts. Such heating obviously results, ordinarily, in serious deviations in alinement of guiding parts, changes in throat diameter of the passes, or the like, with consequent defects in the finished product, in addition to the actual energy loss incurred, often from 50 to 100 k. w., or so, total. By the use of heavy inductive shields as herein contemplated, the varying magnetic fluxes are kept within a definitely restricted zone entirely away from the mechanical working parts of the apparatus, and the eddy current losses usually present here as the result of such stray fluxes are very materially lowered.

In the accompanying drawings I have shown more or less diagrammatically and for purposes of illustration only, certain preferred embodiments of my invention. In the drawings—

Figure 7 is a diagrammatic showing of one form of apparatus by means of which a sinusoidal pulsating current may be obtained; and Figure 8 illustrates diagrammatically a typical sine curve of pulsating current, which represents one type of current of the character preferably utilized in accordance with my invention.

Figure 1:
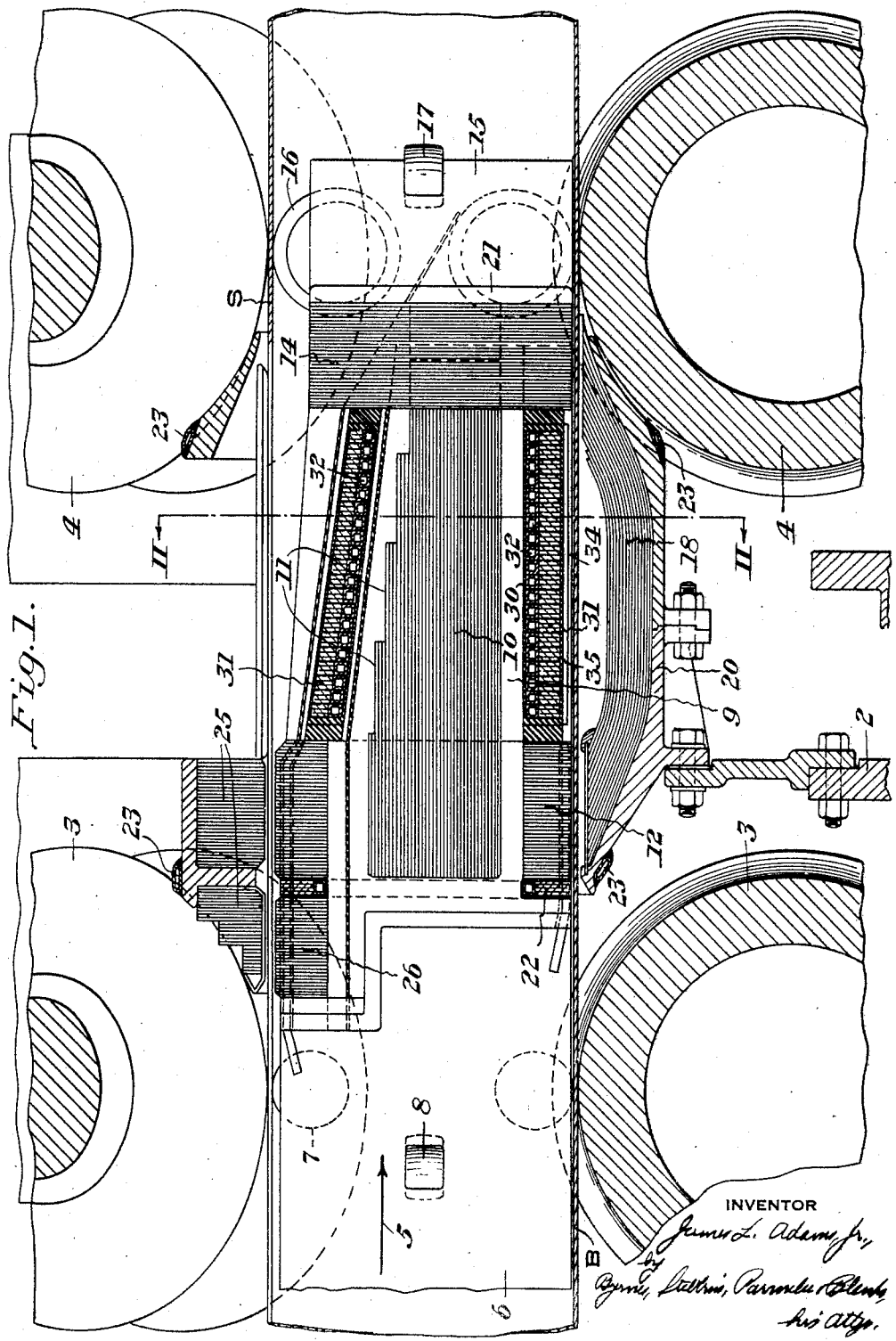
Figure 1 is a longitudinal sectional view through one form of welding apparatus constructed in accordance with the present invention.
Figure 2:
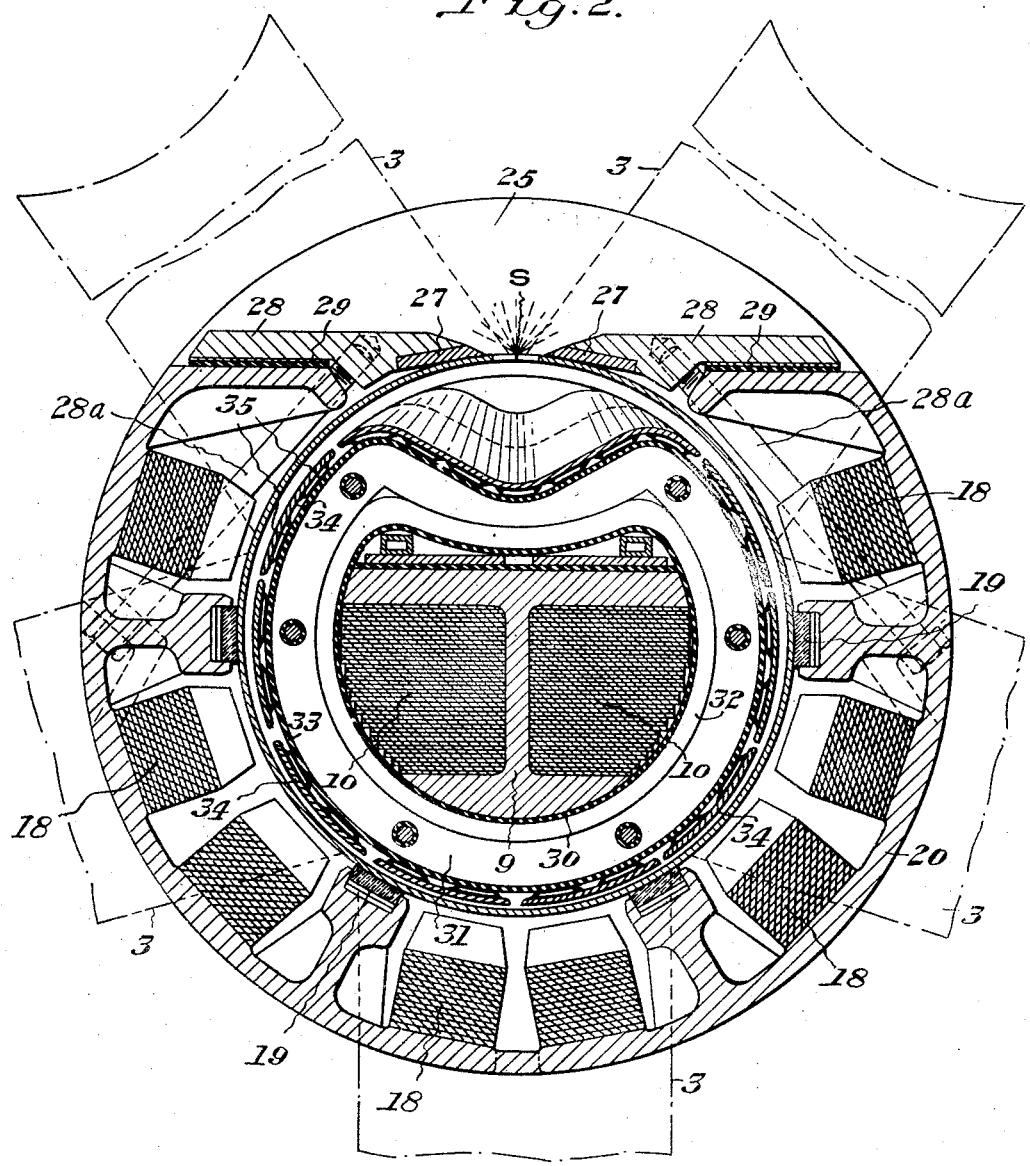
Figure 2 is a transverse sectional view on the line II—II of Figure 1.

Referring first to Figures 1 and 2 of the drawings, there is illustrated a portion of a welding apparatus including a suitable frame structure 2 adapted to provide suitable supports and mountings for entering or crushing rolls 3 and welding rolls 4. The tubular material to be welded is herein illustrated as comprising a blank B and is adapted to travel through the apparatus in the direction indicated by the arrow 5.

The present invention is not limited with respect to the manner of forming the blank B, it being contemplated, however, that a blank of suitable contour shall be provided preferably with the edge portions to be welded in slightly spaced relationship. This condition normally results after the forming up operation due to the inherent springing tendency of the material causing it to partly return toward its original position. Such a blank while traveling through the throat or pass provided by the entering, or crushing rolls, of which any desired number, conveniently five, may be provided, may or may not be accurately sized and crushed to a definite diameter. This cold crushing and sizing operation, when required, usually involves the bringing of the edge portions of the blank together under very considerable pressure.

Supported in any desired manner so as to lie within the pass of the sizing and crushing, or entering rolls 3 is a torpedo or mandrel like extension 6. A general type of support which may be utilized in accordance with my invention is shown in my British Patent No. 316,964, of August 7, 1928, it only being necessary that the support shall be effective to permit the desired axial feeding movement of the blank into the frame structure and over the torpedo. The main body of the torpedo may carry inside rolls 7 adapted to interiorly support and align the opposing edges of the blank while being sized and crushed or simply entered, as well as with any desired number and arrangement of the supplemental guide rolls 8 for assisting during the feeding movement of the blank into the crushing stand.

Secured to the right hand end of the torpedo is an extension which, as shown in Figure 2, comprises a central support 9 of heavy channel or I beam section adapted to give very considerable rigidity to the structure. Suitably cooperating with this stiffening member 9 are laminations 10 and 11. It will be apparent from Figure 1 that the general arrangement of the laminations 11 is such that the entire cross sectional area of the assembly decreases in a direction axially of the torpedo. The stiffening member and laminations constitute an internal core structure which cooperates with inside, substantially circular, magnet poles 12 and 14, which are not closed rings but open on one radius, at least.

It will be noted from Figure 1 that the magnet pole 12 lies just to the right of the entering, or crushing pass, while the magnet pole 14 lies just to the left of the center line of the rolls constituting the welding pass. A suitable core extension 15 carries inside rolls 16 preferably substantially in the center line of the welding roll pass and adapted to interiorly support the tubular material during the actual welding operation, together with internal side guiding rolls 17, the construction of which may be varied as desired provided the entire arrangement be such as to give extreme rigidity. The stiffening member 9 is preferably detachably secured to the main body of the torpedo so as to be readily demounted and replaced if necessary, and is conveniently of "Cyclops", "Monel" or other tough high tensile substantially non-magnetic and high resistance metal, effective for giving great transverse and torsional rigidity to the entire core structure.

By reason of such rigidity, the internal welding rolls 16 may be held more firmly in exact position within the pass against their decided tendency to twist the torpedo or climb over to a one-sided location in the pass and thus distort the weld. In many cases, also, it is desirable to add an internal bead trimmer at the extreme end of the torpedo, so that the inside of the tubular article can be as well surfaced or shaped at the seam as the outside now is. These internal bead trimmers, even if of the best available type, exert a very considerable torsional effort, and heretofore it has not been possible with an induction welding apparatus to provide sufficient torsional rigidity to hold the torpedo in centralized position upon a seam when such a trimmer has been in operation.

Adjacent to the combined core structure just described, but slightly spaced therefrom, are external yokes 18 of any desired number and arrangement preferably shaped to extend well into the pass of the welding rolls, as shown in Figure 1, and cooperating at their opposite ends with the pole pieces 12 and 14 to provide a desirable flux path. The spaces between the poles 12 and 14 and the ends of the yokes 18 are preferably only slightly greater than that required to accommodate the blank being welded, whereby air gaps are cut down substantially to a minimum.

The yokes just referred to may be of any desired construction, but preferably comprise a suitable number and arrangement of laminations such as are customarily utilized for magnetic flux paths of the general character herein contemplated. By reference to Figure 2, it will be noted that each of the yokes is relatively narrow and extends substantially radially of the blank B being welded, the yokes preferably being more or less concentrated around that portion of the blank which is remote from the seam line S, thereby leaving this seam line readily accessible and unobstructed. Intermediate adjacent yokes, or intermediate adjacent groups of yokes, are provided guide strips 19 which, while they may be of suitable metal adapted to resist the wear to which they are subjected by reason of the sliding action of the blank relatively thereto, are preferably of insulating material capable of withstanding the operating conditions, or of lubricated hard wood where well away from the heat of the seam. By using a non-magnetic material, or wood, as referred to, or by the use of a heavy copper enshrouding mounting with non-magnetic metal guides, it will be apparent that there is no tendency for these guides to conduct flux. If they are of material which is not effective as a current conductor, it is also possible to prevent the passage of current therethrough from one point along the blank to another point, or if of metal, each guide should be individually insulated from its supporting structure and subdivided into insulated longitudinal sections.

Immediately surrounding the return yokes 18 and the guides 19, and mounting the same throughout at least the major portion of the zone intermediate the entering, or crushing rolls 3 and the welding rolls 4, is a heavy flux shield 20 preferably of substantially pure cast copper constructed in the form of an encircling casing. This casing preferably entirely encircles the pipe so as to form at both ends of the core, heavy short circuiting copper bands which are substantially continuously connected together by the intermediate cylindrical body portion. This body portion may obviously be of one-piece construction, or may be divided along its axial midline, as indicated in Figure 1, for convenience in assembly. The portion of the casing adjacent the seam line S is preferably cut away, as indicated both in Figures 1 and 2, to provide access to the seam zone and resulting visibility with respect to the operations taking place in this zone.

By reference particularly to Figure 1, it will be noted that this casing or flux shield extends along the blank, well in toward the welding zone, so as to come just as close as possible to the welding rolls in the vicinity of the blank surface. The casing thus constitutes a flux shield which is designed to effectively prevent any periodically variable flux from entering the surfaces of the welding rolls with consequent wasteful heating and distortion thereof together with variations in the pass contour and accuracy afforded thereby. Such a shield with its characteristic operation also prevents increasing the total welder eddy current loss at or adjacent to the welding rolls, and is effective for restricting the flux very sharply to the areas within the inside diameter of the casing.

In like manner, on the inside of the pipe and torpedo, and beyond the pole piece 14, there is shown a very heavy, water cooled, short circuited copper ring flux shield 21, with a second similar flux shield 22 located just outside of the pole 12. These additional flux shields 21 and 22 are designed to assist in keeping the flux limited to its proper sphere along the torpedo, and restricted to the laminated steel paths provided. In addition to the hollow water carrying conduits for the supplemental flux shields, I have indicated similar water cooling means 23 for the flux shield 20.

To those skilled in the art it will be apparent that light metal or thin gauge flux shields would become extremely hot and might thereby cause considerable eddy current losses. With extremely heavy shields of the character indicated, the flux is thrown back bodily without much energy waste. It will be apparent that the inner flux shields 21 and 22 might conceivably be made up of turns of very heavy wall copper tubing with the turns properly short circuited at the ends of the winding and with proper provision for water flow therethrough.

It has been found that where and if the blank or pipe seam is to be forcibly closed at the entering or crushing rolls 3, so that the edges come together under high pressure in the crushing pass, then if the inducing coil happens to be located too near these rolls, some considerable sneak current will flow backward to the point of initial closure or contact and across the seam, in the form of a hairpin loop in the blank, thus causing a wasteful short circuit and some useless heating. This is an undesirable condition, since, as before pointed out, it is desirable to strictly localize and concentrate the heating at or adjacent to the welding zone. To this end it becomes desirable insofar as possible, to stop such sneak currents or choke them off in some manner.

For this purpose, I have indicated laminated steel segments 25 located exteriorly of the blank and close to its surface with a similar laminated steel segment 26 within the blank, and functionally assisted there by the pole-piece laminations 12, on the seam side. The plane of the laminations is preferably transverse to the normal longitudinal course of the sneak currents, so that the latter can easily build up a very large magnetic flux through the path provided, and thus effectually oppose themselves, by the self-inductive effect produced.

It will be understood that the copper shields 20, 21 and 22 previously referred to are effective for opposing stray flux, whereas the laminated segments just described are effective for opposing stray current.

Reference has been made to the fact that the casing 20 constitutes a mounting both for the laminated yokes 18 and for the longitudinally extending guides 19. By reference to Figure 2 of the drawings it will be noted that the guiding strips per se are mounted in a copper shield which is effective substantially completely around three sides of each of the strips, the shield conveniently constituting an integral part of the casing 20, and having the shielding portions just mentioned extending very close to the pipe but not quite in contact therewith. With heavy periodically variable fluxes such as present in an apparatus of the character herein contemplated, this construction is highly desirable in that it definitely keeps such fluxes out of the pipe guiding means. I thus reduce heating of the guides and the consequent rapid distortion from the precise, true alignment thereof along the pipe side such as would tend to disturb materially the accurate abutting engagement of the seam edges which is desired during the heating and welding period.

If the guide strips or bars are capable of conducting current, as before referred to, it will be apparent that unless they are sub-divided longitudinally, and insulated, a sneak current may flow from points along the pipe, forward to the welding position, and then back into the pipe and across the seam to return similarly on the other side of the pipe. Such current will vary from time to time and thereby interfere materially with the constancy of the heat delivered to the seam at various points along the blank. The construction previously described obviates this result.

Reference has already been made to the fact that it is desirable to cut away the flux shield 20 adjacent the seam line so as to provide access and visibility at this point. Further, to this same end, the shape of the guiding means 27 adjacent the seam is preferably somewhat modified as shown in Figure 2, these guiding means conveniently being carried by top-plates 28 mounted on shims 29 and held in position on the casing by bolts 28a. The upper surfaces of the top-plates 28 provide a substantially flat table-like portion upon which, if desired, thin easily replaceable steel surface shield plates (not shown) may be laid to catch the "flashings" or "spittings" from the seam, and thus save the time ordinarily lost by the welder while they are being chiseled free from the machine surfaces upon which they happen to alight. If it is not desired to utilize flat shields or catchers of the character referred to, the upper surfaces may be coated or covered with some solution or material which will prevent the adherence of the flashings or spittings to the plates.

Where the guide strips or bars 19 and 27 are of conducting material, they are longitudinally sectionalized and insulated from each other, and their mounting preferably includes a partial covering at least of insulating material such as mica-plate so as to prevent any currents conducted thereby from passing into the flux shield.

Attention has already been called to the fact that the cross sectional area of the laminations 11 decreases in a direction axially of the torpedo toward the welding rolls 4. Surrounding this core is a layer of insulation 30 around which lies a coil 31. This coil may be of any desired construction, contour and number of turns. If it is to be used alone, for example, for 120 cycle, 685 volt (S. R. M. S.) sinusoidal pulsating current operation on a 20 inch size pipe, it might conveniently be wound with approximately 20 turns as shown, and would preferably either consist of a hollow copper tube winding, or a flat bar winding with a water cooling tube integrally connected therewith on the side away from the pipe. By properly shaping the core, the coil may comprise turns, as shown in Figure 2, dipped downwardly somewhat, on the seam side, and especially so toward the welding end of the coil, thereby affording greater protection from the extreme heat of the seam. The remainder of the coil perimeter should be just as close to the pipe as mechanical and operative conditions will permit. To those skilled in the art, it will be apparent that the desired coil contour may be provided initially by winding suitably annealed material to the desired shape in the first instance, or by winding the coil circularly in the usual way, then cutting out progressively larger segments from the top of the coil turns from one end thereof toward the other, turning these removed segments upside down into the position shown in Figure 2, and copper welding them in place. Since the coil will only have approximately 20 turns in any case, this does not constitute a serious shop problem.

In order to keep the effective portion of the winding as closely adjacent the blank as possible, the water cooling conductor 32 is preferably inside of the coil and adjacent the insulating layer 30. Surrounding the coil is a second layer of insulation 33 outside of which may be positioned a suitable armour conveniently in the form of a series of spaced strips 34, or their operative equivalent, providing a discontinuous current carrying path and carrying water cooling means 35, which may be suitably brazed, 22% silver-soldered, or copper-welded thereto for effectively conducting heat therefrom.

Figure 3:
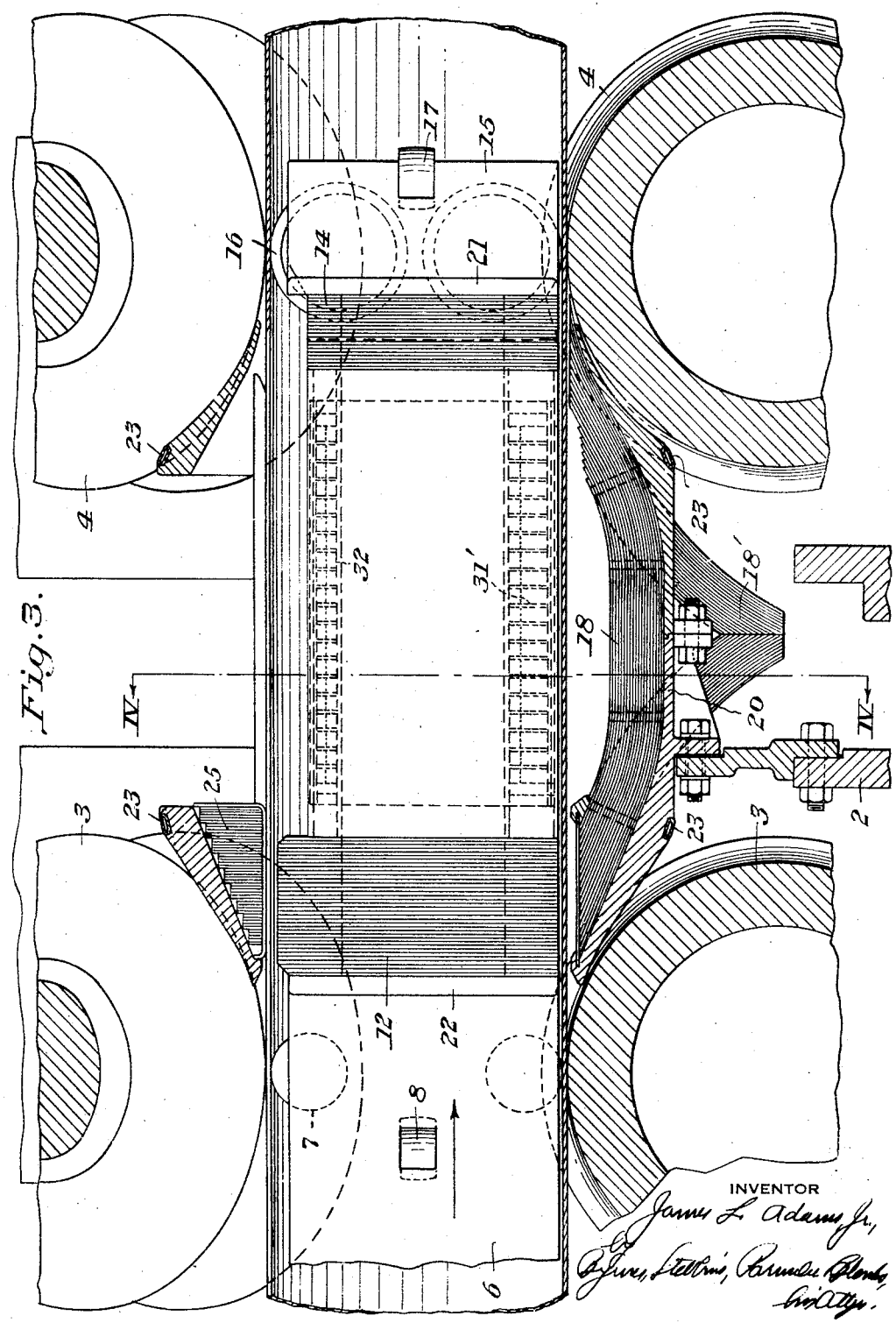
Figure 3 is a view similar to Figure 1, illustrating a modified embodiment of the invention.
Figure 4:
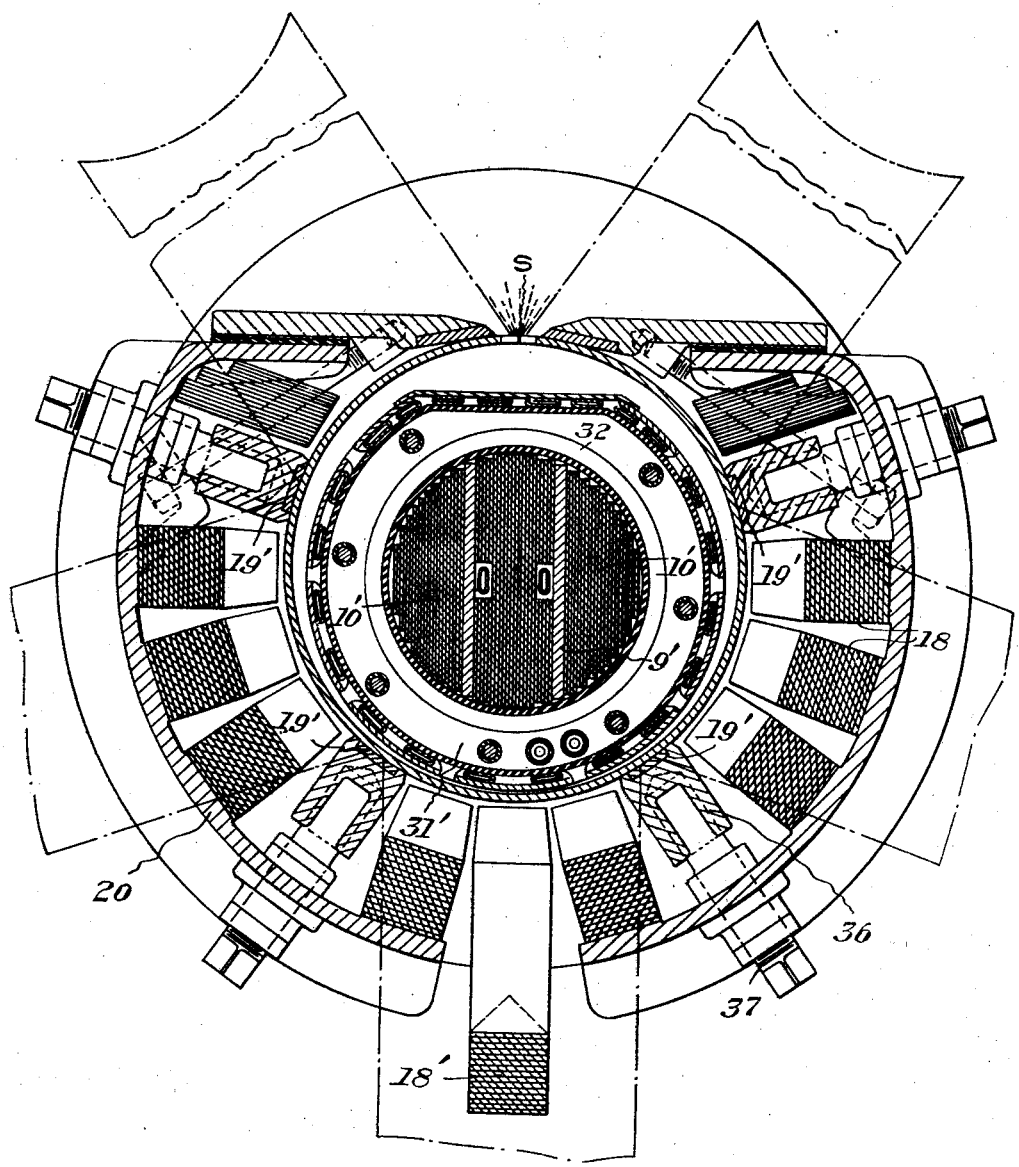
Figure 4 is a transverse sectional view on the line IV—IV of Figure 3.

The structure thus far described is particularly designed for use in the welding of material along the top side thereof during its travel through the welder. In Figures 3 and 4 there is indicated a construction generally similar to that just described, with the principal exception that the flux shield 20 in addition to being cut away at the top adjacent the seam line S, is also cut away slightly at the bottom, thereby providing a small cleaning out zone. The magnetic yoke 18' extending through this zone is preferably of special shape, as indicated in these figures of the drawings, so as to make the desired cleaning out operation capable of more easy performance. I have also illustrated the guide strips 19' in this figure as being carried in saddles or yokes 36, preferably of a shielding material such as copper, which in turn are adapted to be adjusted inwardly or outwardly into the exact position desired by means of adjusting screws 37.

In this embodiment of my invention, as indicated in Figure 4, the central core support 9' is illustrated as being somewhat modified from that illustrated in Figure 2, and the laminations 10' are indicated as providing a core of substantially constant cross sectional area around which the coil 31' is wound. The desired spacing of this coil from the seam line S is obtained by slightly flattening off the upper portion of each turn, as indicated more particularly in Figure 4.

Figure 5:
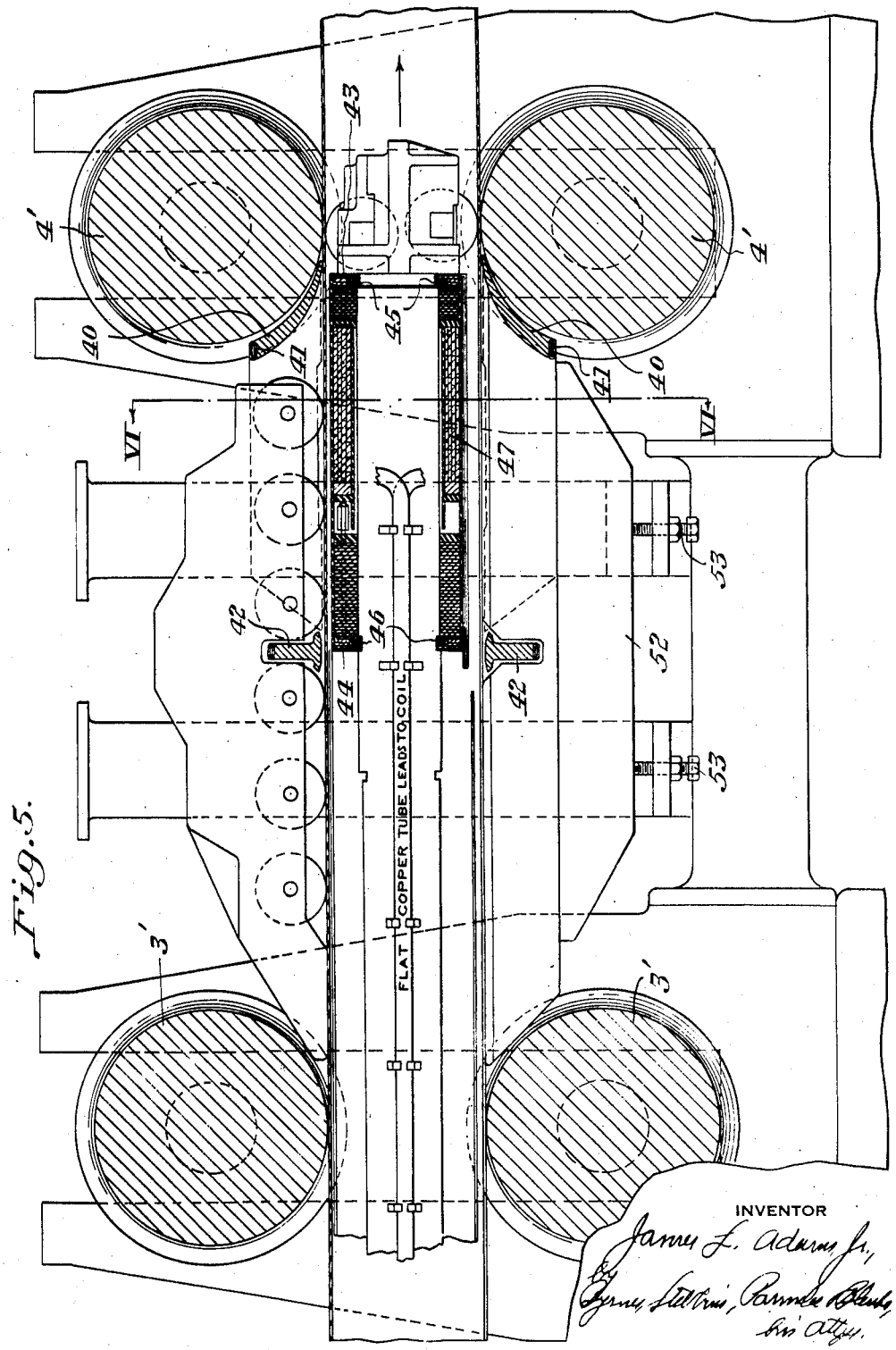
Figure 5 is a view similar to Figures 1 and 3 illustrating another embodiment of the invention.
Figure 6:
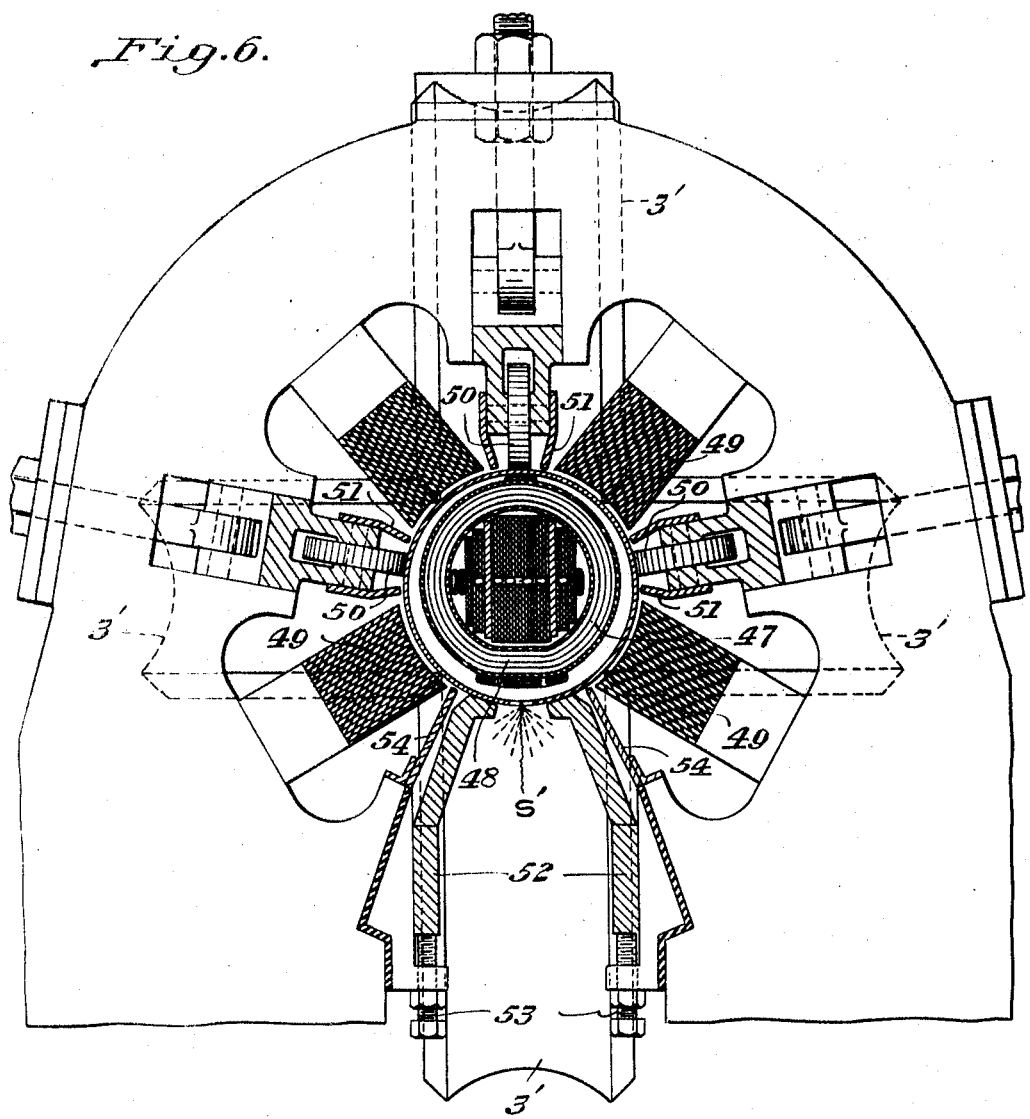
Figure 6 is a detail sectional view along the line VI—VI of Figure 5.

In Figures 5 and 6 there is shown still another embodiment of my invention including entering or crushing rolls 3' and welding rolls 4' mounted in suitable supporting frames. For shielding the welding rolls, there is provided a generally cone shaped heavy copper flux shield 40 having water cooling means 41. A generally similar shield 42, but of different cross sectional characteristics, is provided well to the right of the entering stand. Both of these shielding means are preferably made of very heavy pure or substantially pure copper castings. Cooperating shielding means 43 and 44 for the inner coil and core structures, having water cooling means 45 and 46 respectively, are also provided and serve the purpose generally of the flux shields 21 and 22 illustrated in Figure 1.

The coil 47 is a typical one, preferably being built up of water-cooled flattened-copper current-carrying tubes, or their operative equivalent, and with said coil preferably shaped to provide a fairly wide flat surface 48 adjacent the seam line S' to be welded, which in this case is shown on the bottom of tube.

It will be noted that the construction herein shown also includes magnetic return yokes 49 serving the general purpose hereinbefore referred to, and between or alternating with which are guide rollers 50 herein illustrated as being arranged in series so as to constitute a substantially continuous guide from the entering, or crushing rolls to the welding rolls. Between each adjacent yoke and the guiding rollers, is a heavy copper flux shield 51 for the purpose of definitely keeping any and all flux out of the rollers such as would produce heat, misalignment, loss of accuracy and increased eddy current losses.

The edges of the blank may be suitably held in a desired relationship by edge guiding means 52 adjustable by means of screws 53, these edge guiding means also being shielded by copper flux shields 54.

The foregoing drawings effectively illustrate three different specific embodiments of my invention all of which are characterized by effective flux shielding means and by the use of guiding means which are also very effectively shielded for the purpose of keeping substantially all flux therefrom. They also comprise a pulsating current coil of compact characteristics, but high energy transfer capacity, and preferably shaped to provide a maximum space between the coil periphery and the seam line to thereby protect the coil from the intense heat developed during the actual welding operation, while at the same time keeping most of each turn close to the tube. Reference will now be had to the manner of providing the desired pulsating current for the coil.

In Figure 8 there is a diagrammatic showing of one form of a typical sine curve of pulsating current of the character which may be utilized in accordance with my invention. By pulsating current, I have in mind generally a periodically varying current, the arithmetic mean of which is other than zero, or a current which has regularly recurring variations in magnitude but with the current flow always in the same direction. In Figure 7, there is indicated more or less diagrammatically one form of very simply constructed apparatus which may be utilized in accordance with my invention for commercially producing a pulsating direct current.

As indicated in this figure, any type of available power line 60 supplies input current to a driving motor 61 coupled to a direct current generator 62 of standard 550 volt compound wound type, and to a 400 volt, 120 cycle, single-phase, standard type of alternating current generator 63. In a typical case, the motor may be around 1750 k. w., the D. C. unit 1500 k. w., and the A. C. say 1250 k. v. a. capacity, respectively, although the actual shaft k. ws. transmitted will be approximately 1340 to the D. C., and say 260 k. w. to the A. C. generator, for a 1600 k. w. total generated load, most of the bulk of the A C. or right-hand unit being necessitated simply to get current carrying capacity. The object of this motor generator set is to deliver a smooth, sinusoidal pulsating direct current, and in effect it accomplishes this by superimposing an alternating current sine wave upon the output of the direct current generator with which it is in series, in such way that the resultant current will come to zero periodically, but will never pass therethrough.

Such a motor generator set will have a combined capacity of about 1600 k. w. at 120 cycles, 685 volts (R. M. S.) single-phase. The current will be pulsating in character as shown in Figure 8.

The positive lead 64 of the D. C. generator 62 may be connected to one terminal of a welder inducing coil 65, similar to the coil designated 31 in Figures 1 and 2; 31' in Figures 3 and 4, and 47 in Figures 5 and 6. The other terminal 66 of the D. C. generator leads to one terminal 67 of the A. C. generator 63, the other terminal 68 of which is connected by a conductor 69 to the remaining terminal of the welder inducing coil 65. This is all that is necessary, theoretically, to be able to supply the required type of pulsating current to the welder, but inasmuch as it is desirable, for operative reasons only, that the current output from any standard D. C. generator be free from sudden fluctuations of the frequency mentioned between wide limits, such as would be involved by the connections described, there is provided a branch conductor 70 leading from the connection 64 to one terminal of a suitable storage equipment, such as a series of storage batteries, or electrolytic condensers, or their operative equivalent 71, the remaining terminal of which is connected by a conductor 72 with the connection 66.

This intermittent storage means must be capable of storing the output of the D. C. generator during one-half of each cycle, and giving it out again to the line during each succeeding half cycle, repeatedly. Since the energy storage must persist for only say one-half of 1/120 of a second, it is found that the required current-time storage capacity of the battery, or other means used, will be but a very small fraction of one ampere-hour. The size of plate will therefore be determined solely by maximum, peak-of-wave, current-carrying capacity considerations, which, for example, for a 1600 k. w. input at 684 volts (R. M. S.) pulsating current value, and an 80% power factor, will run to roughly 5000 amperes peak value, or approximately 3000 amperes, root-mean-square, or "effective" value. Since one-half cycle is equal to 1/240 of a second, or 1/864,000 of an hour, a current flow of 3000 amperes will store, in that time 3000/864,000 or 1/288 ampere hour. This is almost a negligible quantity so far as real storage requirements are concerned.

It is entirely possible to design a special single unit generator to deliver the required pulsating current directly, without the interpositioning of any intermittent auxiliary storage means, and it will therefore be understood that the present application is not exclusive of such an embodiment, but is inclusive of any equipment effective for providing the desired current.

It is likewise evident that some means might be developed later on for satisfactorily rectifying a standard or special wave form of alternating current in such wise as to derive some usable form of pulsating current for delivery to a welder inducing coil, and the present application likewise does not exclude such a possibility, it being contemplated that alternating current may be generated of such wave form that upon eventual rectification it will result directly in a substantially sinusoidal or other usable pulsating direct current.

While a pulsating current of the character referred to possesses desirable attributes, its use is ordinarily dependent upon a more liberal iron or core cross section than required for alternating current of the same frequency, and my invention contemplates that the cross sectional area of the various flux carrying parts shall be ample for this purpose, or the frequency raised somewhat to compensate therefor, as I have indicated in the coil and motor generator calculations.

The present invention provides what may be termed a progressive welding process inasmuch as the welding is effected during the movement of a length and therefore is progressively continuous throughout such length as distinguished from a stationary process wherein both the material and the welding means are relatively stationary while a full length welding operation is being performed.

It will further be apparent to those familiar with electric welding apparatus of the general character herein disclosed, that the blank, even if it is forced to close initially, will, after leaving the rolls of the entering or crushing stand, slightly open in such manner that the edges are in slightly spaced relationship. The edges may, however, be held out of contact until they pass beyond the entering rolls. The current induced in the blank as a moving secondary, and flowing circumferentially thereof creates a flash heating zone in the territory in which the edges are so narrowly spaced, provided the induced voltage be high enough to support a flash. As the edges are subsequently brought together slightly in advance of the welding zone, a resistance heating process then takes place followed as quickly as possible by the actual completion of the weld under pressure in and just preceding the pass of the welding rollers.

In order to operate upon pulsating current, it is, of course, not necessary that the tube edges be initially brought together until after the flash heating is completed, unless it is desired to size the cold tube in the entering stand.

Certain very definite advantages accrue from the use of my welder just described, in that the massive operating rolls and the metallic or other guides for the tube, do not become locally distorted due to the carrying of stray eddy currents in large volume, as regularly occurs in an unshielded welder.

This permits greater precision guiding of the opposed edges, and consequently a very materially improved character of weld.

Additional advantages accrue from my use of longitudinally sub-divided tube guides, with the consecutive sections insulated from one another and from ground, this again cutting down stray current losses, and distortion of the alignment surfaces.

Still further advantages accrue from my flat-top type of shield, open along the seam, whereby good, continuous observation of the heating seam can be obtained.

Further advantages arise from my split type of shield, whereby an extremely solid, but readily assembled yoke and tube-guide structure is attained.

Yet further important advantages arise from the combination, for the first time, of all the above, and other advantages, in one and the same mechanism, and from the operation thereof on substantially sinusoidal, pulsating direct current.

The use of a pulsating uni-directional current composed of an alternating current superposed upon a direct current of a voltage greater than the maximum of the alternating current, is of particular advantage in that the number of peaks of the pulsating current is only one-half that of the alternating current since there is no reversal of the current or voltage. Due to the reduced number of peaks, the inducing coils have a much lower reactance and a considerably increased kilowatt input to the latter is made possible.

While I have herein illustrated and described certain preferred embodiments of my invention, it will be understood that changes in the construction and operation of the various parts may be made without departing either from the spirit of my invention or the scope of my broader claims.

I claim:

1. In a continuous electric induction welder, an inducing coil, means for supplying substantially sinusoidal pulsating direct current to said coil, a roll pass for feeding, positioning and supporting an unwelded seam tube secondary for said coil, a welding pass, inter-pass guiding means for positioning said tube secondary, and inter-pass flux shielding means protecting roll-passes and guides from stray unidirectional flux.

2. In a continuous induction tube-welder, a core, an inducing coil wound around the core, means for feeding a formed tube blank with an axial seam past the coil and core in inductive relation to said coil whereby to induce a circumferential welding current in said blank, means for pressing the seam edges together for welding, yokes between the feeding and pressing means positioned to approach the blank closely to complete the magnetic circuit through said core externally of the blank, and conducting disks at the ends of the core for opposing stray flux tending to depart from the magnetic circuit through said core and yokes.

3. In a continuous induction tube-welder, a core, a magnetizing coil wound around the core, a roll stand for feeding a formed tube blank with an axial seam past the coil and core in inductive relation thereto whereby to induce circumferential welding current in the blank, a roll stand for pressing the seam edges together for welding, laminated magnetic yokes between the feeding and pressing roll stands effective to complete the magnetic circuit through said core, and guide strips extending between said roll stands parallel to the common axis thereof and spaced circumferentially of the passes through said stands.

4. In a continuous induction tube welder, a core, an exciting coil disposed about the core, feed rolls for advancing a formed tube blank with an axial seam past the coil and core in inductive relation thereto, welding rolls for pressing the seam edges together, magnetic yokes extending between the feed rolls and the welding rolls to complete the magnetic circuit through said core, and a conducting sleeve at least partially enclosing the yokes and core for opposing the tendency of flux traversing said magnetic circuit to stray therefrom.

5. In a continuous induction tube welder, a magnetizable core, an exciting coil disposed thereabout, feed rolls for advancing a formed tube blank with an axial seam past the coil and core in inductive relation thereto, pressure rolls for forcing the seam edges together, yokes between the feed rolls and pressure rolls for completing the magnetic circuit through said core, pole pieces at the ends of said core effective to transmit flux through the blank to the yokes, and conducting shielding sleeves surrounding said pole pieces for opposing the tendency of the flux to stray from said magnetic circuit.

6. In a continuous induction tube-welder, a magnetizable core, an exciting coil disposed thereabout, feed rolls for advancing the formed tube blank with an axial seam past the coil and core in inductive relation thereto, welding rolls for pressing the seam edges together, means between the feed rolls and the welding rolls for completing the magnetic circuit through said core externally of a blank embracing the latter, and shields of magnetic material disposed about the blank adjacent the welding rolls effective to oppose stray circulating currents in the blank.

7. In a continuous induction tube-welder, a magnetic core, an exciting coil therefor, a roll stand for advancing a formed tube blank past the core and coil in inductive relation thereto, a roll stand for pressing the edges of the seam together, a conducting shield in the form of a conical annulus adjacent one of said roll stands for opposing the tendency of flux traversing said core to stray from its magnetic circuit, and a magnetic shield adjacent the pressure roll stand so disposed as to partially embrace a tube blank passing therethrough, effective for opposing the tendency of current induced in said blank to stray from a direct path circumferentially thereof.

8. In a continuous induction tube-welder, a magnetic core, an exciting coil therearound, feed rolls for advancing a formed tube blank with an axial seam in inductive relation to the coil and core, welding rolls for pressing the seam edges together, magnetic yokes between the feed rolls and the welding rolls substantially parallel to the common axis thereof and spaced circumferentially of the pass therethrough, blank guiding strips disposed between the yokes and substantially parallel thereto, and a conducting shield at least partially embracing said yokes, said shield having portions partially surrounding said strips.

9. In a continuous induction tube-welder, a magnetic core, an exciting coil wound therearound, feed rolls for advancing a formed tube blank with an axial seam past said core in inductive relation thereto, welding rolls for pressing the edges of the blank together, a conducting shield at least partly embracing said core but spaced radially therefrom, and substantially plane members carried on said shield adjacent the seam of a blank passing over the core to form a table for receiving hot metal ejected therefrom.

10. In an induction tube-welder, a magnetic core, an exciting coil therefor, feed rolls for moving a formed tube blank with an axial seam past the coil and core, welding rolls for pressing the edges of the blank together, pole pieces at the ends of said core, magnetic yokes between the feed rolls and welding rolls terminating adjacent said pole pieces to complete a magnetic circuit through said yoke, conducting discs adjacent said pole pieces, and conducting rings disposed adjacent the feed rolls and welding rolls but spaced radially from a blank passing therethrough, said discs and rings being effective to confine the flux induced in the core to the magnetic circuit thereof.

11. In an induction tube-welder, a magnetic core, an exciting winding therefor, feed rolls for advancing a tube blank with an axial seam past said coil and core in inductive relation thereto, welding rolls for pressing the edges of the seam together after passing said core, magnetic yokes between the feed rolls and welding rolls for completing a magnetic circuit for the core external to the blank, guide rolls between the yokes adapted to engage the blank at circumferentially spaced points, guide bars engaging the blank adjacent the seam edges, and conducting shields adjacent the guide rolls and guide bars for opposing the tendency of flux from the magnetic circuit to stray thereinto.

12. In a continuous induction tube-welder, a magnetic core, an exciting coil therefor, feed rolls for advancing a tube blank with an axial seam past said coil and core in inductive relation thereto, welding rolls for pressing the seam edges together after passing said core, yokes extending between the feed rolls and the welding rolls substantially parallel to the axis of their common paths and spaced circumferentially thereabout to permit the passage of a blank, a conducting, flux-shielding sleeve at least partially surrounding said yoke, conducting, flux-shielding rings adjacent the feed rolls and welding rolls and surrounding their respective passes and conducting, flux-shielding discs adjacent the ends of said core, said sleeve, rings and discs being effective to oppose the tendency of any flux to stray from the magnetic circuit composed of said core and yokes.

JAMES L. ADAMS, Jr.